(12) United States Patent  (10) Patent No.: US 7,790,262 B2
Morita  (45) Date of Patent: Sep. 7, 2010

(54) OPTICAL RECORDING MEDIUM AND METHOD FOR MANUFACTURING THE SAME

(75) Inventor: Kuniyuki Morita, Sanda (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 11/557,328

(22) Filed: Nov. 7, 2006

(65) Prior Publication Data

US 2007/0154676 A1 Jul. 5, 2007

(30) Foreign Application Priority Data

Nov. 15, 2005 (JP) .............................. 2005-330250

(51) Int. Cl.
*B32B 3/02* (2006.01)

(52) U.S. Cl. ................. 428/64.1; 428/64.4; 430/270.11

(58) Field of Classification Search ....................... None
See application file for complete search history.

(56) References Cited

U.S. PATENT DOCUMENTS 6,787,211 B2 * 9/2004 Kishima .................... 428/64.1

FOREIGN PATENT DOCUMENTS

JP 05-266472 10/1993
JP 2004-288270 10/2004

* cited by examiner

*Primary Examiner*—Elizabeth Mulvaney
(74) *Attorney, Agent, or Firm*—Fitzpatrick, Cella, Harper & Scinto

(57) ABSTRACT

The generation of a ski jump along a peripheral portion of an optical recording medium when a resin layer is formed by a spin coating method is suppressed. In particular, in order to suppress the ski jump in the optical recording medium, a cover layer is directly provided on an optical catalytic effect layer, which is provided at least along a peripheral portion of a substrate having a concavo-convex shape.

16 Claims, 9 Drawing Sheets

FIG. 6A  Step 1 FORMATION OF L0 LAMINATE FILM
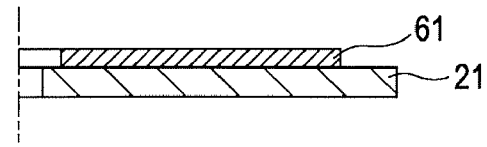
FIG. 6B  Step 2 FORMATION OF INTERLAYER
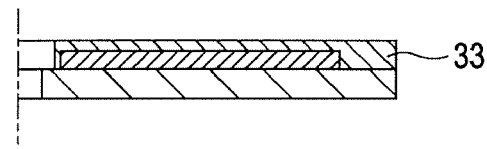
FIG. 6C  Step 3 FORMATION OF L1 OPTICAL CATALYTIC EFFECT LAYER
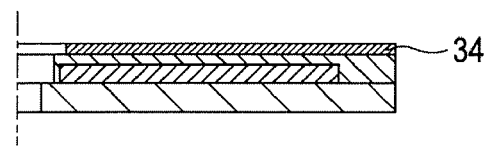
FIG. 6D  Step 4 UV IRRADIATION
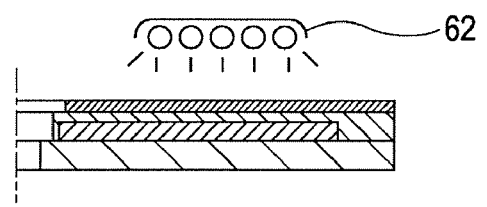
FIG. 6E  Step 5 FORMATION OF L1 LAMINATE FILM
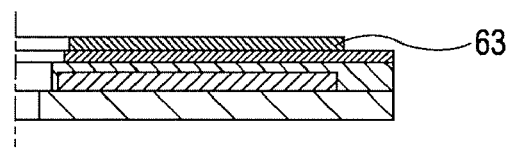
FIG. 6F  Step 6 FORMATION OF COVER LAYER
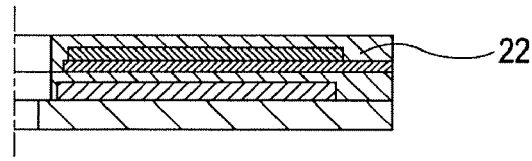

OPTICAL RECORDING MEDIUM AND METHOD FOR MANUFACTURING THE SAME

BACKGROUND OF THE INVENTION

1. Field of the Invention

The present invention relates to an optical recording medium for recording and reproducing information using laser light and a manufacturing method thereof, and more particularly, relates to a multilayer recording medium having a plurality of information recording layers and a manufacturing method thereof.

2. Description of the Related Art

Heretofore, when a resin layer such as a cover layer is formed for protecting a recording layer in manufacturing of an optical recording medium, a spin coating method has been frequently employed since it is performed at a reasonable cost and is easily controlled.

In a Blu-ray Disc having a multilayer structure, a spin coating method has also been used; however, there have been problems in terms of film thickness accuracy.

Among the problems in film thickness accuracy, a phenomenon (hereinafter referred to as a "ski jump") in which a resin protrudes along an outermost peripheral portion of a substrate has been very serious. FIG. 10 is a schematic view showing the peripheral portion of an optical recording medium formed by a spin coating. A height Δ101 of the protrusion of a resin formed along the peripheral portion is called the ski jump. When a cover layer is formed by a spin coating method, the film thickness accuracy is disadvantageously degraded particularly along the peripheral portion. In the cover layer, in addition to the variation in optical aberration caused by inferior film thickness accuracy, a problem in that the protrusion portion mechanically interferes with a recording/reproducing drive of the optical recording medium may arise.

In addition, recently, a medium having a plurality of recording layers with at least one transparent resin-made interlayer interposed therebetween has been introduced on the market.

However, this interlayer is required to have a uniform thickness. In addition, in this interlayer, the generation of the ski jump also causes a problem similarly to the case of the above cover layer. In the case in which the film thickness accuracy of the interlayer is degraded because of the generation of the ski jump, a problem in that the information recording layers are difficult to be separated may arise.

In order to avoid this ski jump, various methods have been proposed.

For example, according to Japanese Patent Application Laid-Open No. 2004-288270, a method has been proposed in which the substrate is fitted in a recess formed in a tool which is in conformity with the substrate size so as to planarize the peripheral portion of the substrate. Since curing is performed in the state in which the substrate is fitted in the recess of the tool, the formation of the ski jump can be avoided; however, resin entering the space between the substrate and the tool forms a resin flash. Furthermore, when the substrate is recovered from the tool, new problems, such as chipping of the resin, may occur in some cases.

In addition, in order to avoid the problems described above, when the substrate is recovered from the tool in the state in which the resin is uncured, the ski jump may still occur due to the surface tension, and as a result, the original purpose to avoid the ski jump cannot be achieved.

Besides this proposal, a method has been proposed in which the ski jump itself is blown away by applying a nitrogen gas to the peripheral portion as disclosed in Japanese Patent Application Laid-Open No. 05-266472; however, for example, since UV irradiation is simultaneously performed, a general spin coating method cannot be used, and hence an exclusive complicated apparatus may be disadvantageously required.

As described above, in the related methods for avoiding the ski jump, new problems may arise or a complicated apparatus may be required.

That is, a method for solving the fundamental problems relating to the wettability of a surface onto which a resin is applied and the surface tension thereof have not been proposed at all.

Hereinafter, the reasons the ski jump is generated will be described.

When the surface has poor wettability, the resin applied thereto tends to form a spherical shape because of the surface tension thereof. Since the whole resin applied to a flat portion of a substrate tends to form a spherical shape on average, it forms a flat surface along the substrate as a whole; however, since the resin is not present outside the end portion of the substrate, the surface tension of the resin at the outermost periphery of the substrate becomes relatively large as compared to that of the other portions. Consequently, the resin in the vicinity of the outermost periphery protrudes, and as a result, the ski jump is formed.

As described above, heretofore, when the resin layer is formed by a spin coating method, there has been no method that overcomes the generation of the ski jump based on the consideration of the wettability of a surface onto which a resin is applied and the surface tension thereof.

SUMMARY OF THE INVENTION

Accordingly, the present invention provides an optical recording medium having a simple structure and having superior film thickness accuracy.

To this end, an optical recording medium according to the present invention comprises: a substrate; at least one recording layer provided on the substrate; a cover layer for protecting the recording layer; and an optical catalytic effect layer provided at least along a peripheral portion of the substrate, wherein the cover layer is directly provided on the optical catalytic effect layer.

In another aspect of the present invention, a method for manufacturing an optical recording medium includes forming at least one recording layer on a substrate, forming an optical catalytic effect layer provided at least along a peripheral portion of the medium, and forming a cover layer, with at least a portion of the cover layer provided directly on the optical catalytic effect layer.

Further features of the present invention will become apparent from the following description of exemplary embodiments with reference to the attached drawings.

BRIEF DESCRIPTION OF THE DRAWINGS

FIGS. 6A to 6F are views showing a process for manufacturing a two-layer optical recording medium according to the present invention.

DETAILED DESCRIPTION OF THE PREFERRED EMBODIMENTS

Hereinafter, embodiments according to the present invention will be described with reference to the accompanying drawings.

Figure 1:
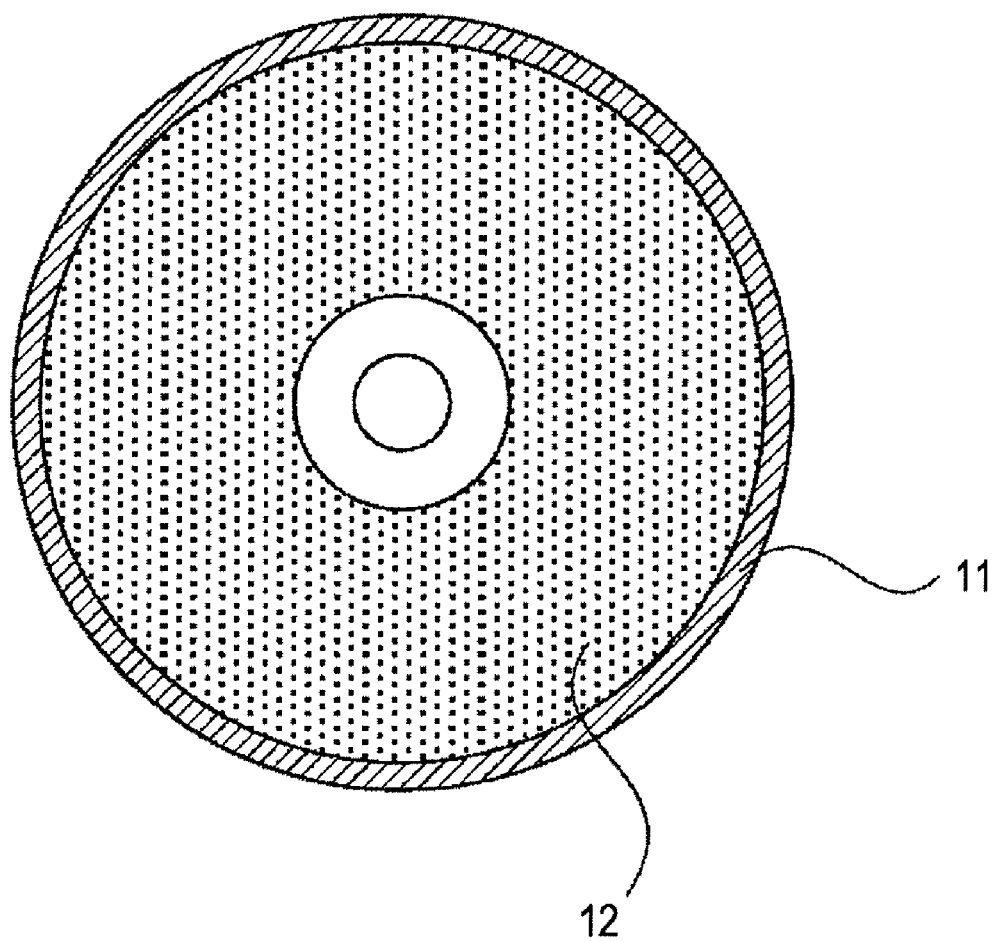
FIG. 1 is a schematic view of an optical recording medium according to the present invention.

FIG. 1 is a schematic view of an optical recording medium according to the present invention. An optical catalytic effect layer 11 is provided outside the periphery of a recording layer or a reflective layer (hereinafter referred to as an "information recording layer") 12 of an optical recording medium of the present invention.

Figure 2A:
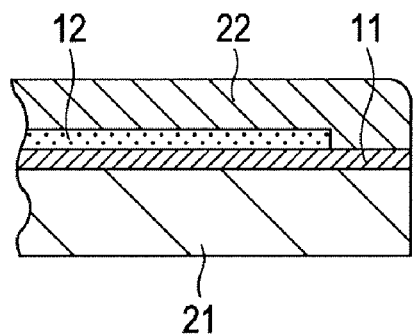
FIGS. 2A to 2C are schematic views each showing a peripheral portion of a single-layer optical recording medium according to the present invention.
Figure 2B:
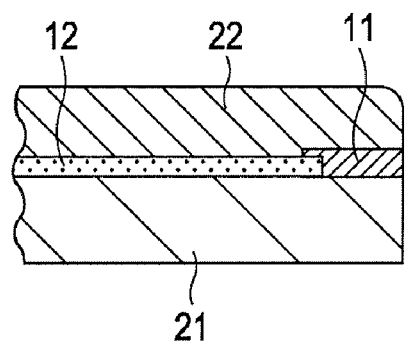
Figure 2C:
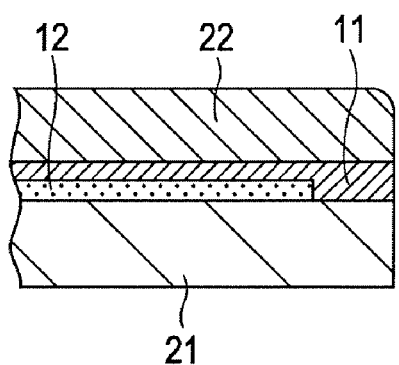

FIGS. 2A to 2C are schematic views each showing a peripheral portion of an optical recording medium having a single information recording layer according to the present invention. In FIG. 2A, the optical catalytic layer 11 is provided on a concavo-convex pattern (not shown) formed on a substrate 21, and in addition, the information recording layer 12 and a cover layer 22 are further formed in that order, so that a single-layer optical recording medium is formed. In the optical recording medium according to the present invention, the optical catalytic effect layer 11 having a high wettability compared to that of a topmost portion of the information recording layer may be provided at least outside the periphery of the information recording layer so as to be at least in contact with the surface of the cover layer. Accordingly, besides the structure in which the optical catalytic effect layer is provided between the substrate and the information recording layer, as shown in FIG. 2A, the structure as shown in FIG. 2B or 2C may also be used and is not particularly limited.

In FIG. 2B, the optical catalytic effect layer 11 is provided only at the peripheral side of the information recording layer 12. In addition, in FIG. 2C, the optical catalytic effect layer 11 is partly provided on the information recording layer 12 at a side opposite to the substrate 21. In this case, the optical catalytic effect layer is required to have optical properties which do not adversely influence reading and writing of the information recording layer. Hereinafter, the optical properties of the optical catalytic effect layer will be described.

The properties of an optical catalytic effect layer containing titanium oxide will first be described. When an optical catalyst represented by titanium oxide is irradiated with light such as ultraviolet rays, hydrophobic molecules attached to the surface of the catalyst are decomposed to expose hydroxyl groups, and moisture in the air is trapped thereby. Accordingly, effects such as ultra-hydrophilic properties and stain-proofing properties can be obtained.

The optical catalytic effect layer has been known to improve hydrophilic properties (wettability to moisture); however, according to the result of research carried out by the inventors of the present invention, it is understood that the optical catalyst also has an effect of improving the wettability when it is used for resins. When the optical catalytic effect layer is provided along an outermost peripheral portion of an interlayer or a cover layer at which the ski jump is liable to occur so as to be in contact with the interlayer or the cover layer, the wettability of the above portion to a resin can be improved, and hence the ski jump generated by the reason described above can be effectively suppressed.

Figure 3:
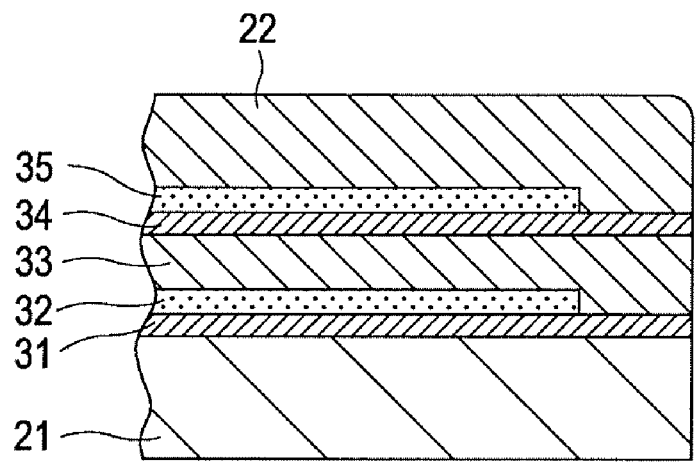
FIG. 3 is a schematic view of a peripheral portion of a two-layer optical recording medium according to the present invention.

FIG. 3 is a schematic view of a peripheral portion of an optical recording medium having two information recording layers according to the present invention. In the figure, a single-sided two-layer structure, which has two information recording layers provided on one side of the substrate, is shown. The information recording layer at the substrate side is called an L0 information recording layer, and the information recording layer further therefrom is called an L1 information recording layer.

On an L0 concavo-convex pattern (not shown) for the L0 information recording layer, which is formed on the substrate 21, an L0 optical catalytic effect layer 31 for the L0 information recording layer is formed, and an L0 information recording layer 32 and an L0-L1 interlayer 33 are further formed. Subsequently, an L1 concavo-convex pattern (not shown) for the L1 information recording layer, an L1 optical catalytic effect layer 34 for the L1 information recording layer, and an L1 information recording layer 35 are formed on the L0-L1 interlayer 33 in that order, and the cover layer 22 is finally formed, so that the two-layer optical recording medium shown in FIG. 3 is formed. Although the structure shown in FIG. 3 is formed by repeating the single-layer structure shown in FIG. 2A twice while the optical properties of the individual layers are adjusted, the single-layer structure shown in FIG. 2B or 2C may also be repeated twice, or the above single-layer structures may also be used in combination; hence, the structure shown in FIG. 3 is not particularly limited. Since being formed by a combination of the structures shown in FIGS. 2A to 2C, the structure of this embodiment is formed with the optical catalytic effect layers provided for both the L0 and L1 information recording layers. However, in the present invention, the optical catalytic effect layer may be at least provided so as to be in contact with the surface of the cover layer. The reason for this is that since the thickness of the cover layer is largest among the layers formed by a spin coating, the ski jump of the cover layer tends to be largest. Accordingly, the structure may be formed in which the optical catalytic effect layer is provided only for the L1 information recording layer and is not particularly limited.

Figure 4:
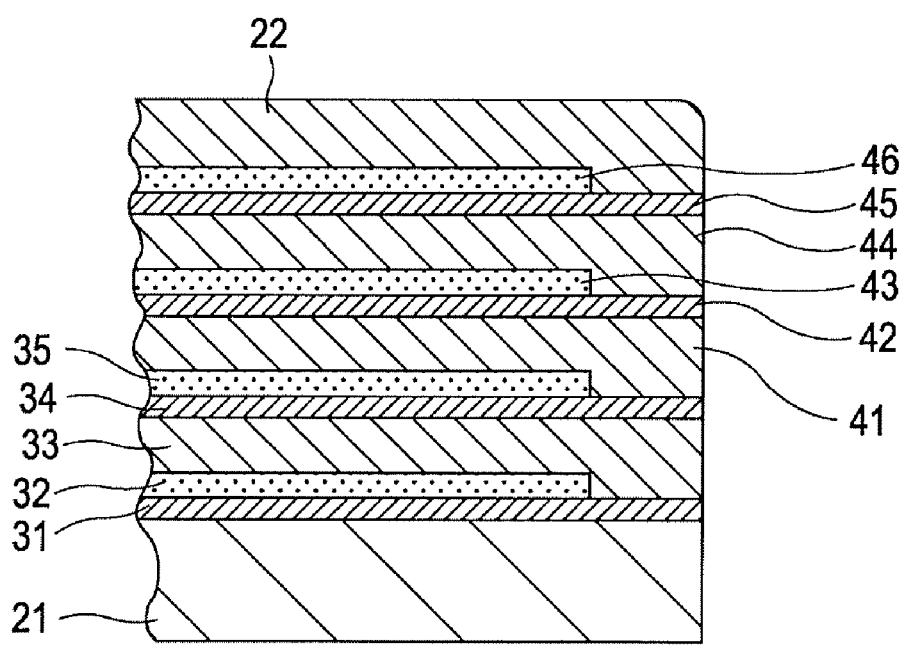
FIG. 4 is a schematic view of a peripheral portion of a four-layer optical recording medium according to the present invention.

FIG. 4 is a schematic view showing a peripheral portion of an optical recording medium having four information recording layers according to the present invention. A single-sided four-layer structure in which four information recording layers are provided on one side of the substrate is shown in this figure. The information recording layers are called L0, L1, L2, and L3 information recording layers in that order from the substrate side.

On the L0 concavo-convex pattern (not shown) formed on the substrate 21, the L0 optical catalytic effect layer 31 is formed, and the L0 information recording layer 32 and the L0-L1 interlayer 33 are further formed. Next, the L1 concavo-convex pattern (not shown) for the L1 information recording layer is formed on the L0-L1 interlayer. Subsequently, the L1 optical catalytic effect layer 34, the L1 information recording layer 35, an L1-L2 interlayer 41, and an L2 concavo-convex pattern (not shown) for the L2 information recording layer are formed. Furthermore, an L2 optical catalytic effect layer 42 for the L2 information recording layer, an L2 information recording layer 43, an L2-L3 interlayer 44, an L3 concavo-convex pattern (not shown) for the L3 information recording layer, an L3 optical catalytic effect layer 45 for the L3 information recording layer, and an L3 information recording layer 46 are formed in that order. Finally, the cover layer 22 is formed, so that the four-layer optical recording medium shown in FIG. 4 is formed. Although the structure shown in FIG. 4 is formed by repeating the single-layer structure shown in FIG. 2A four times, the single-layer structures shown in FIGS. 2A, 2B and 2C may be used alone or in combination; hence, the structure shown in FIG. 4 is not particularly limited. In addition, as is the case of the two-layer optical recording medium in FIG. 3, the optical catalytic effect layer may be provided for each information recording layer or may be provided only for the L3 information recording layer and is not particularly limited.

Figure 5A:
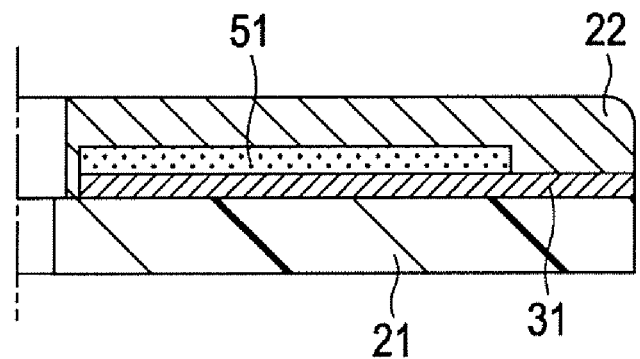
FIGS. 5A and 5B are schematic views each showing a layer structure of a single-layer optical recording medium according to the present invention.
Figure 5B:
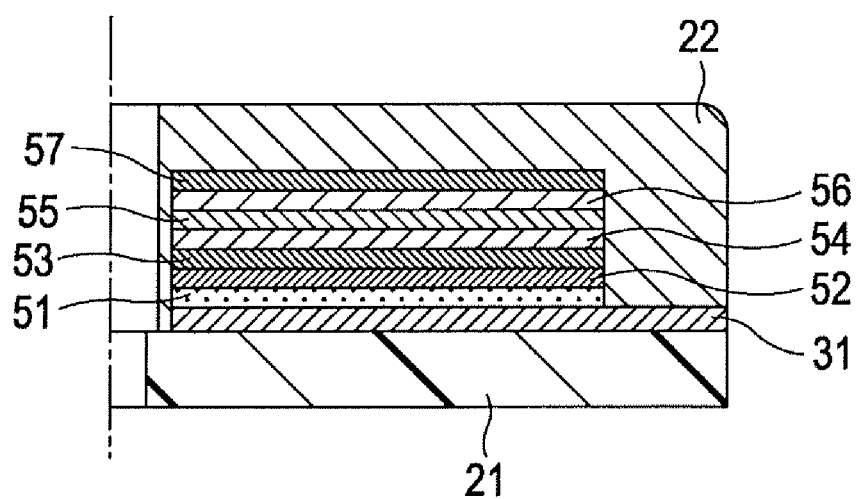

FIGS. 5A and 5B show details of the structure of the single-layer optical recording medium according to the present invention, which was described with reference to FIGS. 2A to 2C. FIG. 5A shows a right side of the layer structure of a read-only optical recording medium, and FIG. 5B shows a right side of the layer structure of a rewritable recording medium. Since the left side from the center is symmetrical to the right side, it is omitted. The side close to the substrate is called a substrate side, and the side to which laser rays are directed is called an incident side.

For the substrate 21, a polycarbonate resin, a polyolefin resin, an acrylic resin or the like may be used; however, the material is not particularly limited as long as it transfers a concavo-convex shape and also retains its shape. In addition, as shown in FIGS. 2A to 2C, 3, and 4, when the information recording layer is provided on one side of the substrate, and when laser rays are incident on the information recording layer side, since the substrate is not required at all to have particular optical properties, a material primarily formed, for example, of paper may also be used; hence, the material is not particularly limited.

For the optical catalytic effect layer 11 (31, 34, 42, 45), $TiO_2$ which is used as a high refractive index layer is also preferably used since it has a superior optical catalytic effect.

For a reflective layer 51, for example, a Ag alloy or an Al alloy may be used. For a semi-transparent reflective layer, for example, Si or SiN may be used.

For an optical absorption correction layer 52, for example, SiN or GeCr may be used.

For a substrate-side dielectric layer 53 and an incident-side dielectric layer 57, for example, ZnS or ZnS—$SiO_2$ may be used.

For a substrate-side interface layer 54 and an incident-side interface layer 56, a corrosion resistant material, such as a GeCrN or SiN, may be used.

For a recording layer 55, a phase change material such as GeSbTe or GeSnSbTe may be used.

For the cover layer 22, for example, an ultraviolet curable resin or a thermosetting resin may be used, and in addition, a material which has small absorption in a wavelength range of recording and reproducing laser rays is preferable.

Although examples of the materials for the individual layers are mentioned, they may be optionally selected in consideration of optical properties required for the layer structure and/or recording and reproducing methods and are not particularly limited.

In addition, the two-layer optical recording medium shown in FIG. 3 and the four-layer optical recording medium shown in FIG. 4 may be produced by repeatedly forming the individual layers using the materials described with reference to FIGS. 5A and 5B while the optical properties thereof are appropriately adjusted.

FIGS. 6A to 6F show steps of a method for manufacturing the two-layer optical recording medium according to the present invention. Hereinafter, the individual steps will be described in detail with reference to FIGS. 6A to 6F. In these figures, an optical recording medium will be described by way of example in which one optical catalytic effect layer is only provided so as to be in contact with the surface of the cover layer. In addition, as is the case shown in FIGS. 5A and 5B, only the right side of the cross-section of the optical recording medium is shown.

In Step 1, an L0 laminate film 61 for the L0 information recording layer is formed on the L0 concavo-convex pattern (not shown) provided on the substrate 21. This L0 laminate film 61 includes an L0 reflective layer, an L0 optical absorption correction layer, an L0 substrate-side dielectric layer, an L0 substrate-side interface layer, an L0 recording layer, an L0 incident-side interface layer, and an L0 incident-side dielectric layer, which are laminated in that order.

In Step 2, a resin is applied onto the L0 laminate film by a spin coating method, and the L1 concavo-convex pattern is transferred by a stamper (not shown). Next, curing is performed by an energy ray irradiation apparatus (not shown), so that the L0-L1 interlayer 33 is formed. When ultraviolet rays or the like are used as the energy rays, the stamper is required to allow the energy rays to pass therethrough; however, the material of the stamper may be optionally selected in accordance with energy rays to be used and is not particularly limited. As the resin for the interlayer, an ultraviolet curable resin or a thermosetting resin may be used, and a material having small absorption in a wavelength range of recording and reproducing laser rays is preferable. In a spin coating method, when spinning is performed after the resin is applied onto the substrate other than the central hole, the resin applied so as to have an annular shape is extended to the peripheral side, and as a result, the annular shape formed by application is retained at the inner circumferential side. In the state in which the application is performed so as to form an annular shape, the resin thus applied has a small thickness at the inner and the outer circumferential sides, and hence after the spin coating, the thickness of the resin tends to be small at the inner circumferential side. In order to avoid this problem, various methods have been proposed such as a method in which a resin is dripped after the central hole is blocked, followed by multistage control of the rotation number in spin coating; however, a method may be appropriately selected in accordance with a resin to be used and is not particularly limited.

In Step 3, the L1 optical catalytic effect layer 34 is formed. As a material for the L1 optical catalytic effect layer 34, any material may be used as long as it has an optical catalytic effect. However, when the L1 optical catalytic effect layer can also be used as an L1 high refractive index layer, the manufacturing cost can be reduced. Hence, $TiO_2$ is preferably used since it can be used as the L1 high refractive index layer and has a superior optical catalytic effect. In addition, the optical catalytic effect layer may be provided separately from the high refractive index layer and is not particularly limited; however, a layer having no adverse influence on the optical performance is preferably used.

In Step 4, in order to enable the L1 optical catalytic effect layer to have an optical catalytic effect, irradiation of ultraviolet rays is performed by an ultraviolet irradiation apparatus 62.

In Step 5, as is the case of Step 1, layers are laminated to each other to form an L1 laminate film 63 for the L1 information recording layer. The steps of forming the individual layers in Steps (1) and (4) will be described in detail with reference to FIGS. 7 and 8.

In Step 6, a green cover layer 22 is formed by a spin coating method equivalent to that in Step 2, followed by curing by an energy irradiation apparatus (not shown) to form the cover layer 22, so that the two-layer optical recording medium is formed. A hard coat layer may further be formed on the cover layer to protect the medium from being scratched or contaminated.

In FIGS. 6A to 6F, the steps of the two-layer optical recording medium are described. Alternatively, after the optical catalytic effect layer is provided on an L0 signal pattern, only Steps 1, 3, 4, and 6 need be performed to form a single-layer optical recording medium. In addition, between the L0 laminate film and the interlayer shown in FIG. 6F, Steps 2 and 5 can be repeatedly performed while the optical properties of the individual layers are controlled to realize a multilayer structure having more than two layers.

Figure 7:
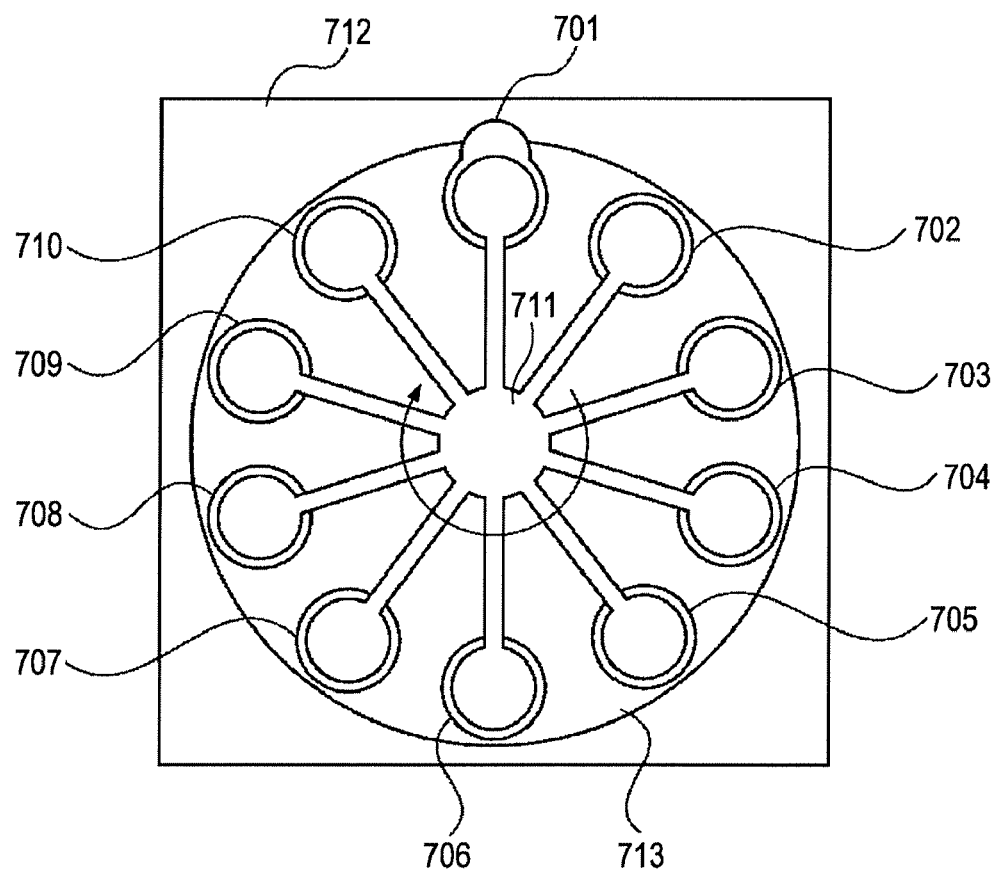
FIG. 7 is a schematic view of a film-forming apparatus according to the present invention.

FIG. 7 is a schematic view of a film-forming apparatus for manufacturing the optical recording medium according to the present invention. The film-forming apparatus 712 is formed of 10 chambers, and as a film-forming method, a sputtering method is employed. The flow of the film-forming process will be described.

By a handling mechanism (not shown) and the like, a substrate (not shown) is fitted to an arm 711 and is introduced in the film-forming apparatus from a load lock chamber 701. Subsequently, the apparatus is evacuated to a predetermined vacuum level, and the substrate is transferred by the rotation of the arm into an optical catalytic effect-layer chamber 702 for forming the optical catalytic effect layer. The substrate provided with the optical catalytic effect layer is transferred into an ultraviolet irradiation chamber 703 and is then irradiated with ultraviolet rays. Next, the reflective layer and the optical absorption correction layer are formed in a reflection-layer chamber 704 and an optical adsorption correction-layer chamber 705, respectively, in that order. Subsequently, the substrate-side dielectric layer, the substrate-side interface layer, and the recording layer are formed in a substrate-side dielectric-layer chamber 706, a substrate-side interface-layer chamber 707, and a recording-layer chamber 708, respectively. Furthermore, the incident-side interface layer, and the incident-side dielectric layer are formed in an incident-side interface-layer chamber 709, and an incident-side dielectric-layer chamber 710, respectively. Finally, the substrate is recovered from the load lock chamber 701 by the handling mechanism (not shown) and the like and is then transferred to a subsequent intermediate-layer or a cover-layer forming step. The individual chambers and the arm structure will be described later in detail.

When the film structure of the L0 laminate film is formed of layers having the same elements as those of the layers of the film structure of the L1 laminate film, the apparatus can be used for forming both laminate films.

In addition, in FIG. 7, the film-forming apparatus can produce a structure in which the optical catalytic effect layer is formed closer to the substrate than any other layers, as shown in FIG. 2A; however, the arrangement of the chambers may be optionally selected in accordance with a desired film structure, and the order of the chambers is not limited to that described above.

Figure 8:
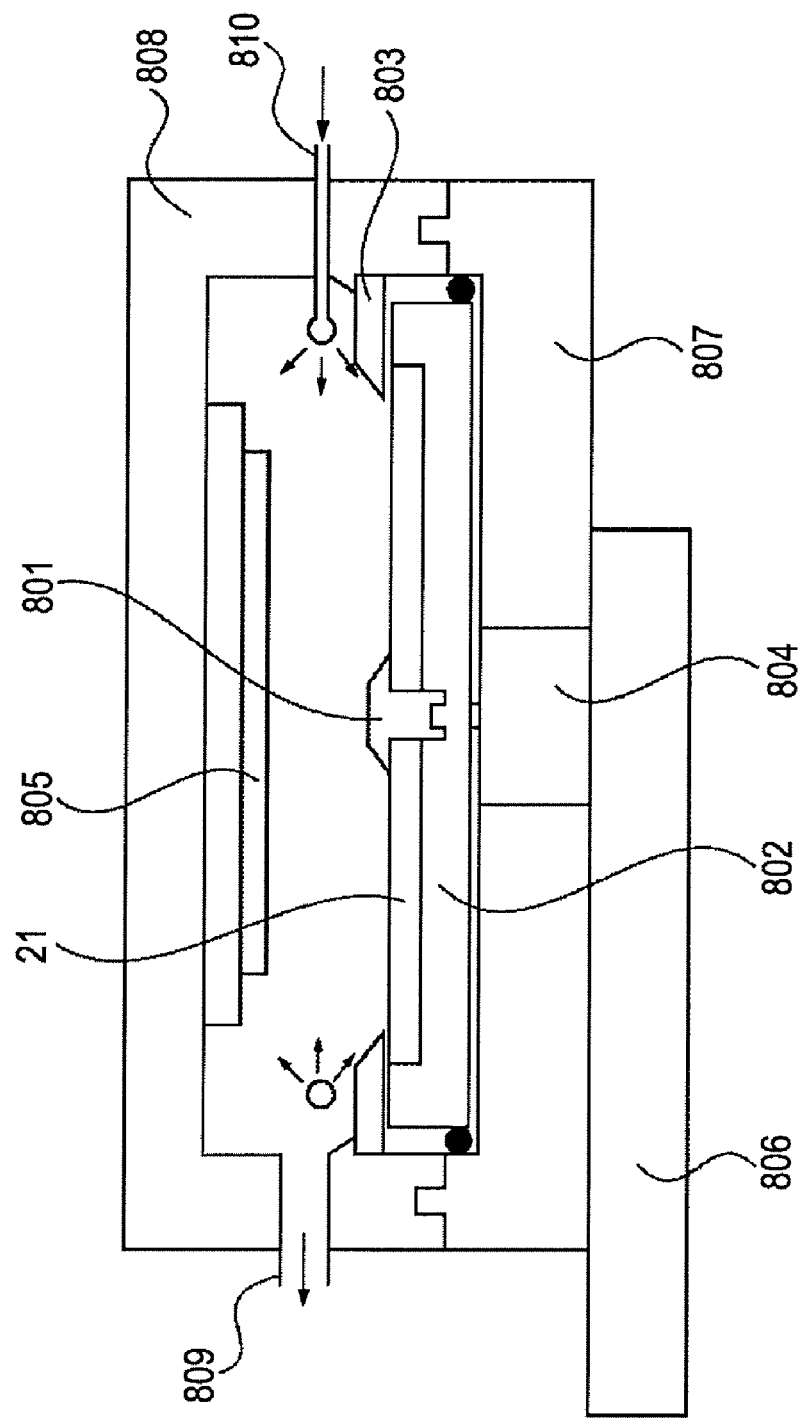
FIG. 8 is a schematic view of a chamber portion of a film-forming apparatus according to the present invention.

FIG. 8 is a view illustrating the chambers and the arm structure in more detail. The substrate 21 is placed between an inner circumference holding tool 801, which is also used an inner circumferential mask, and a periphery holding tool 802, which is also used as a mask for the side surface of the substrate periphery. An arm-side moveable chamber 807 moved by the rotation of an arm 806 is engaged with each film-forming apparatus-side fixed chamber 808, and a peripheral mask 803 provided for the film-forming apparatus-side fixed chamber is simultaneously placed at a signal pattern side of the substrate. The optical catalytic effect layer may be formed as shown in one of FIGS. 2A to 2C. The structure shown in FIG. 2A or 2C is simpler and can be realized when the peripheral mask is removed only in the optical catalytic effect-layer chamber. In addition, when the optical catalytic effect layer is formed only outside the periphery of the information recording layer as shown in FIG. 2B, a peripheral mask having a large inside diameter and an inner circumference holding tool having a large outside diameter may be used so that the area in which the optical catalytic effect layer is to be formed is not masked. In this case, the structure can be realized when a film-forming apparatus only for the optical catalytic effect layer is separately provided. Although not particularly limited, in a simpler manner, the peripheral mask may be removed. In addition, in the ultraviolet irradiation chamber, the peripheral mask must be removed.

The inside of the chambers thus engaged is evacuated via an exhaust port 809. After the inside is evacuated to a predetermined vacuum level, an argon gas for generating plasma is introduced from a gas line 810. An alloy target may be used as a film-forming target for forming a film having a predetermined composition. In addition, reactive sputtering may be performed by simultaneously introducing oxygen, nitrogen or the like from a different gas line (not shown). The gas may be selected in accordance with the performance of an optical recording medium to be formed and is not particularly limited. After the gas is introduced, a voltage is applied to electrodes (not shown) to generate electric discharge, so that the film formation on the substrate is started. Since the periphery holding tool and the substrate are rotated by the rotation of a rotating motor 804 during the film formation, the deviation of the film formation can be prevented, and as a result, the film formation can be uniformly performed.

Figure 9A:
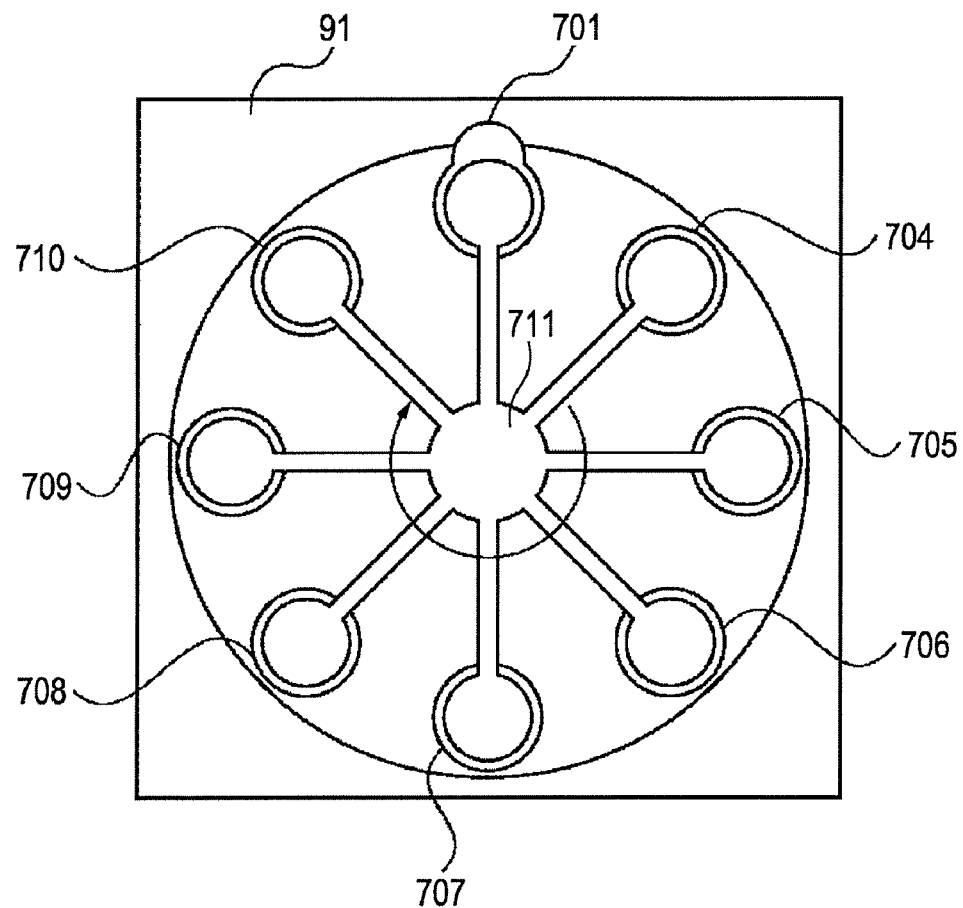
FIGS. 9A and 9B are schematic views each showing an example of a film-forming apparatus suitably used for mass production according to the present invention.
Figure 9B:
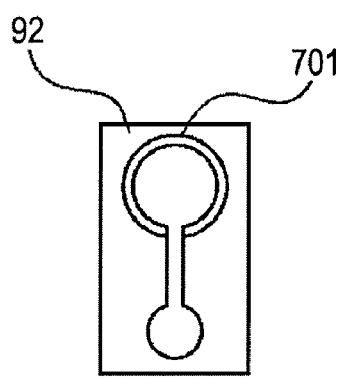
Figure 10:
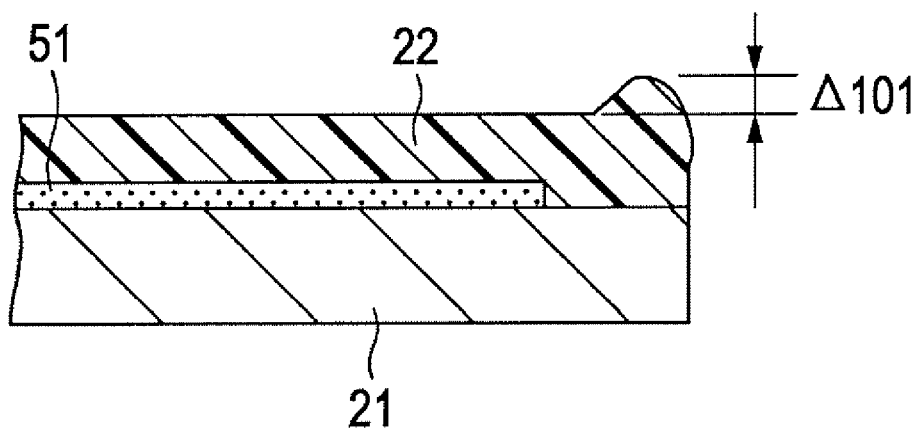
FIG. 10 is a view illustrating a ski jump of an optical recording medium formed by conventional spin coating.

A method for manufacturing the optical recording medium according to the present invention, which is performed by using two film-forming apparatuses shown in FIGS. 9A and 9B, will be described. In this method, only the optical catalytic effect layer is formed in the apparatus shown in FIG. 9B. An information recording-layer forming apparatus 91 shown in FIG. 9A is equivalent to the film-forming apparatus 712 shown in FIG. 7 except that the optical catalytic effect-layer chamber and the ultraviolet irradiation chamber are not provided, and the other features of the apparatus 91 are equivalent to those of the film-forming apparatus 712. The flow of the film forming process is equivalent to that described with reference to FIG. 7 except that the film formation of the optical catalytic effect layer and the ultraviolet irradiation are not performed. An optical catalytic effect-layer forming apparatus 92 shown in FIG. 9B is the optical catalytic effect-layer chamber separated from the film-forming apparatus 712. In the multilayer optical recording medium according to the present invention, when the medium is formed with only one optical catalytic effect layer that is in contact with the surface of the cover layer, the formation of an optical catalytic effect layer is not necessary for information recording layers which are located closer to the substrate than the optical catalytic effect layer. In the case in which the structure described above is formed using the film-forming apparatus 712 shown in FIG. 7, in the formation of the information recording layer which requires no optical catalytic effect layer, production efficiency is seriously degraded since the discharge is not performed in the optical catalytic effect-layer chamber, and the irradiation is not performed in the ultraviolet irradiation chamber. Accordingly, in consideration of the productivity of the optical recording medium in mass production, the film formation of the information recording layers is performed by the information recording-layer forming apparatus 91 shown in FIG. 9A. In addition, it is preferable that the film formation of the optical catalytic effect layer be performed only in the optical catalytic effect-layer forming apparatus shown in FIG. 9B, and that the ultraviolet irradiation be performed by an ultraviolet irradiation apparatus (not shown). By the structure as described above, the deterioration in production efficiency caused by performing no film formation and no ultraviolet irradiation in the film formation chamber and the ultraviolet irradiation chamber, respectively, can be avoided. In addition, in accordance with the number of the information recording layers and the number of the optical catalytic effect layers, respective film-forming apparatuses may only be prepared, and in addition, a general ultraviolet irradiation apparatus may also be used; hence, the optical recording medium can be manufactured at a more reasonable cost.

EXAMPLES

Next, with reference to examples, the present invention will be described in more detail.

Example 1

In accordance with one embodiment of the present invention, a single-layer rewritable optical recording medium having only the L0 information recording layer was formed.

The substrate was formed by injection molding. As a resin material for the substrate, a polycarbonate resin (sold under the trade name "N-340" manufactured by Mitsubishi Engineering-Plastics Corporation) was used. As a material for a stamper placed in a mold of an injection molding machine, Ni was used.

The substrate thus formed was fixed in the film-forming apparatus shown in FIG. 7 by the periphery holding tool and the inner circumference holding tool shown in FIG. 8, and the inside of the chambers was evacuated to $10^{-5}$ Pa. Subsequently, after the L0 optical catalytic effect layer was formed, ultraviolet irradiation was performed, and the L0 reflective layer, the L0 optical absorption correction layer, the L0 substrate-side dielectric layer, the L0 substrate-side interface layer, the L0 recording layer, the L0 incident-side interface layer, and the L0 incident-side dielectric layer were formed in that order.

As the optical catalytic effect layer, a $TiO_2$ film having a thickness of 20 nm was formed by reactive sputtering using a $TiO_2$ target, an argon gas, and an oxygen gas. The flow rate of the argon gas and that of the oxygen gas were set to 49 sccm and 1 sccm, respectively.

As the L0 reflective layer, a Ag-alloy film having a thickness of 80 nm was formed by sputtering using a Ag-alloy target and an argon gas. The flow rate of the argon gas was set to 50 sccm.

As the L0 optical absorption correction layer, a SiN film having a thickness of 5 nm was formed by reactive sputtering using a Si target, an argon gas, and a nitrogen gas. The flow rate of the argon gas and that of the nitrogen gas were set to 43 sccm and 24 sccm, respectively.

As the L0 substrate-side dielectric layer, a ZnS film having a thickness of 10 nm was formed by sputtering using a ZnS target and an argon gas. The flow rate of the argon gas was set to 100 sccm.

As the L0 substrate-side interface layer, a SiN film having a thickness of 5 nm was formed by reactive sputtering using a Si target, an argon gas, and a nitrogen gas. The flow rate of the argon gas and that of the nitrogen gas were set to 43 sccm and 24 sccm, respectively.

As the L0 recording layer, a GeSbTe film having a thickness of 10 nm was formed by sputtering using a GeSbTe alloy target and an argon gas. The composition ratios of Ge, Sb, and Te were 8, 2, and 11, respectively, on an atomic percent basis. The flow rate of the argon gas was set to 50 sccm.

As the L0 incident-side interface layer, a SiN film having a thickness of 5 nm was formed by reactive sputtering using a Si target, an argon gas, and a nitrogen gas. The flow rate of the argon gas and that of the nitrogen gas were set to 43 sccm and 24 sccm, respectively.

As the L0 incident-side dielectric layer, a ZnS film having a thickness of 45 nm was formed by sputtering using a ZnS target and an argon gas. The flow rate of the argon gas was set to 100 sccm.

Subsequently, after the substrate provided with the L0 information recording layer was recovered from the film-forming apparatus, a resin was applied onto the substrate by a spin coating method to form the cover layer. The target thickness was set to 100 µm. As a material for the cover layer, an ultraviolet curable resin (sold under the trade name "KARAYAD INC-118" manufactured by Nippon Kayaku Co., Ltd.) was used and was dripped while the central hole was blocked by a cap. The rotational speed at a low velocity during the resin dripping was set to 100 rpm, the rotational speed at a high velocity during the resin application was set to 850 rpm, and the time for the high velocity was set to 20 seconds. After the application, the cap blocking the central hole was removed, and the resin was cured by the ultraviolet irradiation apparatus to form the cover layer, so that the single-layer optical recording medium was formed.

The height of the ski jump on the cover layer of the single-layer optical recording medium thus formed was measured, and the results are shown in Table 1. For this measurement, Alphastep-500 (manufactured by TENCOR Co., Ltd.) was used.

TABLE 1

Ski Jump Distribution on Cover Layer of Single-Layer Optical Recording Medium of Present Invention

| Position in Circumferential Direction [°] | | | | | |
|---|---|---|---|---|---|
| 0 | 30 | 60 | 90 | 120 | 150 |

| Δ [µm] | 11 | 12 | 10 | 11 | 9 | 10 |

| Position in Circumferential Direction [°] | | | | | |
|---|---|---|---|---|---|
| 180 | 210 | 240 | 270 | 300 | 330 |

| Δ [µm] | 12 | 11 | 11 | 10 | 10 | 11 |

From the results shown in Table 1, it is understood that in the single-layer optical recording medium formed in accordance with this example, the height of the ski jump was sufficiently decreased, and that the effect of suppressing the ski jump can be obtained by the optical catalytic effect layer.

In addition, with the single-layer optical recording medium thus formed, recording and reproducing can be performed without causing any troubles.

Example 2

In accordance with the embodiment of the present invention, a two-layer rewritable optical recording medium having the L0 and the L1 information recording layers was formed. The optical catalytic effect layer was formed so as to be in contact with only the surface of the cover layer, that is, was formed only for the L1 information recording layer.

The formation of the substrate was performed in a manner equivalent to that in Example 1. On the L0 signal pattern, the optical catalytic effect layer was not formed, and the formation from the L0 reflective layer to the L0 incident-side dielectric layer was performed in a manner equivalent to that described in Example 1. Onto the L0 incident-side dielectric layer, a resin was applied by a spin coating method to form the interlayer. The target thickness was set to 25 µm. As a material for the interlayer, the same material as that for the cover layer in Example 1 was used, and the resin was dripped while the central hole was blocked by a cap. The rotational speed at a low velocity during the resin dripping was set to 100 rpm, the rotational speed at a high velocity during the resin application was set to 2,750 rpm, and the time for the high velocity was set to 27 seconds. After the application of the resin, the cap blocking the central hole was removed, and an L1 signal pattern was transferred by using a stamper made of a polycarbonate resin transparent to ultraviolet rays, followed by curing the resin by an ultraviolet irradiation apparatus, so that the interlayer was formed.

The substrate provided with the interlayer was again placed in the film-forming apparatus shown in FIG. 7, and after the evacuation was performed to a level equivalent to that of the L0 information recording layer formation, the optical catalytic effect layer was formed. As the optical catalytic effect layer, a $TiO_2$ film having a thickness of 10 nm was formed. After the optical catalytic effect layer was formed, ultraviolet irradiation was performed, and the formation from an L1 reflective layer to an L1 incident-side dielectric layer was then performed. The structures and the compositions of the individual layers for the L1 information recording layer were not changed from those of the respective layers forming the L0 information recording layer, and the thicknesses of the individual layers were adjusted so as to have a reflectance of 10% and a transmittance of 65%.

Subsequently, onto the substrate provided with the L0 and the L1 information recording layers, which was recovered from the film-forming apparatus, a resin was applied by a spin coating method to form the cover layer. The target thickness was set to 75 µm. As a material for the cover layer, the same material as that for the interlayer was used, and the resin was dripped while the central hole was blocked by a cap. The rotational speed at a low velocity during the resin dripping was set to 100 rpm, the rotational speed at a high velocity during the resin application was set to 1,850 rpm, and the time for the high velocity was set to 25 seconds. After the application, the cap blocking the central hole was removed, and the resin was cured by an ultraviolet irradiation apparatus to form the cover layer, so that the two-layer optical recording medium was formed.

The height of the ski jump on the cover layer of the two-layer optical recording medium thus formed was measured, and the results are shown in Table 2.

TABLE 2

Ski Jump Distribution on Cover Layer of Two-Layer Optical Recording Medium of Present Invention

| | Position in Circumferential Direction [°] | | | | | |
|---|---|---|---|---|---|---|
| | 0 | 30 | 60 | 90 | 120 | 150 |
| Δ [um] | 10 | 9 | 9 | 11 | 10 | 9 |
| | Position in Circumferential Direction [°] | | | | | |
| | 180 | 210 | 240 | 270 | 300 | 330 |
| Δ [um] | 8 | 9 | 10 | 11 | 10 | 9 |

From the results shown in Table 2, it is understood that in the two-layer optical recording medium formed in accordance with this example, the height of the ski jump was sufficiently decreased, and that the effect of suppressing the ski jump can be obtained by the optical catalytic effect layer. In addition, with the two-layer optical recording medium thus formed, recording and reproducing can be performed without causing any troubles.

Example 3

In accordance with the embodiment of the present invention, a four-layer rewritable optical recording medium having the L0, the L1, the L2, and the L3 information recording layers was formed. The optical catalytic effect layer was formed so as to be in contact with only the surface of the cover layer, that is, was formed only for the L3 information recording layer.

The formation of the substrate was performed in a manner equivalent to that in Example 1. The optical catalytic effect layer was not provided on the L0 signal pattern, and the formation from the L0 reflective layer to the L0 incident-side dielectric layer was performed by the film-forming apparatus shown in FIG. 9A. The steps and the parameters of the film forming process were equivalent to those in Examples 1 and 2. A resin was applied onto the L0 incident-side dielectric layer by a spin coating method to form the L0-L1 interlayer. The target thickness was set to 10 µm. As a material for the L0-L1 interlayer, since the target thickness is small, "KARAYAD MD-500" (manufactured by Nippon Kayaku Co., Ltd.) having a low viscosity as compared to that used in Examples 1 and 2 was used. After the central hole was blocked by a cap, the resin was dripped. The rotational speed at a low velocity during the resin dripping was set to 100 rpm, the rotational speed at a high velocity during the resin application was set to 1,750 rpm, and the time for the high velocity was set to 30 seconds. After the application of the resin, the cap blocking the central hole was removed, the L1 signal pattern was transferred using a stamper made of a polycarbonate resin transparent to ultraviolet rays, and the resin was cured by an ultraviolet irradiation apparatus, so that the L0-L1 interlayer was formed.

The substrate provided with the L0-L1 interlayer was again placed in the film-forming apparatus shown in FIG. 9A, and the formation from the L1 reflective layer to the L1 incident-side dielectric layer was performed. The steps and the parameters of the film forming process were equivalent to those in Example 2. A resin was applied onto the L1 incident-side dielectric layer to form the L1-L2 interlayer in a manner equivalent to that of the L0-L1 interlayer. The target thickness was set to 20 μm. The process for the L1-L2 interlayer was performed in a manner equivalent to that of the L0-L1 interlayer except for the rotational speed. The rotational speed at a low velocity during the resin dripping was set to 100 rpm, the rotational speed at a high velocity during the resin application was set to 1,200 rpm, and the time for the high velocity was set to 30 seconds. After the application of the resin, the cap blocking the central hole was removed, an L2 signal pattern was transferred using a stamper made of a polycarbonate resin transparent to ultraviolet rays, and the resin was cured by an ultraviolet irradiation apparatus, so that the L1-L2 interlayer was formed.

The substrate provided with the L1-L2 interlayer was again placed in the film-forming apparatus shown in FIG. 9A, and the formation from an L2 reflective layer to an L2 incident-side dielectric layer was performed. The structures and the compositions of the individual layers for the L2 information recording layer were not changed from those of the respective layers for the L1 information recording layer, and the thicknesses of the individual layers were only adjusted so as to have a reflectance of 6% and a transmittance of 75%. A resin was applied onto the L2 incident-side dielectric layer to form the L2-L3 interlayer in a manner equivalent to that of the two interlayers described above. The target thickness was set to 15 μm. If the thicknesses of the interlayers differ from each other, multiple reflections between the layers can be avoided. The process for the L2-L3 interlayer was performed in a manner equivalent to that of the two interlayers described above except for the rotational speed. The rotational speed at a low velocity during the resin dripping was set to 100 rpm, the rotational speed at a high velocity during the resin application was set to 1,425 rpm, and the time for the high velocity was set to 24 seconds. After the application of the resin, the cap blocking the central hole was removed, an L3 signal pattern was transferred using a stamper made of a polycarbonate resin transparent to ultraviolet rays, and the resin was cured by an ultraviolet irradiation apparatus, so that the L2-L3 interlayer was formed.

The substrate provided with the L2-L3 interlayer was placed in the optical catalytic effect-layer forming apparatus shown in FIG. 9B, and the catalytic effect layer was formed. As the catalytic effect layer, a $TiO_2$ film having a thickness of 7 nm was formed. After the optical catalytic effect layer was formed, UV irradiation was performed by a UV irradiation apparatus (not shown), and the substrate was then again placed in the film-forming apparatus shown in FIG. 9A, so that the formation from an L3 reflective layer to an L3 incident-side dielectric layer was performed. The structures and the compositions of the individual layers for the L3 information recording layer were not changed from those for the respective layers of the L1 and the L2 information recording layers, and the thicknesses of the individual layers were only adjusted so as to have a reflectance of 4% and a transmittance of 80%.

Subsequently, after the substrate provided with the L0 to L3 information recording layers was recovered from the film-forming apparatus, a resin was applied onto the substrate by a spin coating method to form the cover layer. The target thickness was set to 55 μm. As a material for the cover layer, the material used in Examples 1 and 2 was used, and after the central hole was blocked by a cap, the resin was dripped. The rotational speed at a low velocity during the resin dripping was set to 100 rpm, the rotational speed at a high velocity during the resin application was set to 2,600 rpm, and the time for the high velocity was set to 30 seconds. After the application, the cap blocking the central hole was removed, and the resin was cured by an ultraviolet irradiation apparatus to form the cover layer, so that the four-layer optical recording medium was formed.

The height of the ski jump on the cover layer of the four-layer optical recording medium thus formed was measured, and the results are shown in Table 3.

TABLE 3

Ski Jump Distribution on Cover Layer of Four-Layer Optical Recording Medium of Present Invention

| | Position in Circumferential Direction [°] | | | | | |
|---|---|---|---|---|---|---|
| | 0 | 30 | 60 | 90 | 120 | 150 |
| Δ [um] | 8 | 8 | 9 | 10 | 9 | 9 |
| | Position in Circumferential Direction [°] | | | | | |
| | 180 | 210 | 240 | 270 | 300 | 330 |
| Δ [um] | 8 | 9 | 10 | 9 | 8 | 9 |

From the results shown in Table 3, it is understood that also in the four-layer optical recording medium formed in accordance with this example, the height of the ski jump is sufficiently decreased, and that the effect of suppressing the ski jump can be obtained by the optical catalytic effect layer. In addition, with the four-layer optical recording medium thus formed, recording and reproducing can be performed without causing any troubles.

In addition, it is also understood that when the optical catalytic effect layers are provided for all the L0, L1, L2, and L3 information recording layers, the formation of the ski jump can be more effectively suppressed. The reason for this is that although individual ski jumps are generated in individual information recording layers and, although relatively small individually, can collectively form a large ski jump, these individual ski jumps can be suppressed by the respective optical catalytic effect layers. As a result, the final accumulated ski jump can also be suppressed.

COMPARATIVE EXAMPLES

The effect of the optical recording medium formed according to the embodiments of the present invention will be verified by an optical recording medium formed in accordance with other methods.

Comparative Example 1

A single-layer optical recording medium was formed having a structure in which an optical catalytic layer was not provided in a region outside the periphery of the recording layer or the reflective layer in the radial direction. The single-layer optical recording medium was formed in a manner equivalent to that in Example 1, except that the formation of the optical catalytic effect layer and the ultraviolet ray irradiation therefor were not performed. The other steps, such as the spin coating, were performed as was the case of Example 1. The measurement results of the ski jump along the periphery of the single-layer optical recording medium formed in Comparative Example 1 are shown in Table 4.

TABLE 4

Ski Jump Distribution of Single-Layer Optical Recording
Medium Provided with No Optical Catalytic Effect Layer

| | Position in Circumferential Direction [°] | | | | | |
|---|---|---|---|---|---|---|
| | 0 | 30 | 60 | 90 | 120 | 150 |
| Δ [um] | 57 | 53 | 55 | 54 | 51 | 50 |

| | Position in Circumferential Direction [°] | | | | | |
|---|---|---|---|---|---|---|
| | 180 | 210 | 240 | 270 | 300 | 330 |
| Δ [um] | 52 | 53 | 52 | 57 | 54 | 55 |

From the results shown in Table 4, it is understood that when the cover layer is formed by a spin coating method without forming the optical catalytic effect layer, the height of the ski jump is generally increased, and as a result, the recording and reproducing properties are degraded. In addition, the thickness distribution of the peripheral portion is degraded due to the ski jump, and recording and reproducing were interfered with in some cases, for example, by collision with a pickup device.

Comparative Example 2

A two-layer optical recording medium was formed having a structure in which an optical catalytic layer was not provided in a region outside the periphery of the recording layer or the reflective layer in the radial direction. The two-layer optical recording medium was formed in a manner equivalent to that in Example 2 except that the formation of the L0 optical catalytic effect layer and the ultraviolet ray irradiation therefor were not performed. In addition, when the L1 optical catalytic effect layer was formed, the peripheral mask was used so that a $TiO_2$ layer was formed as a high refractive index layer of a layer structure, and the ultraviolet irradiation step therefor was omitted. The other steps, such as the spin coating, were performed as was in the case of Example 2. The measurement result of the ski jump along the peripheral portion of the two-layer optical recording medium formed in Comparative Example 2 is shown in Table 5.

TABLE 5

Ski Jump Distribution of Two-Layer Optical Recording
Medium Provided with No Optical Catalytic Effect Layer

| | Position in Circumferential Direction [°] | | | | | |
|---|---|---|---|---|---|---|
| | 0 | 30 | 60 | 90 | 120 | 150 |
| Δ [um] | 45 | 49 | 47 | 54 | 50 | 48 |

| | Position in Circumferential Direction [°] | | | | | |
|---|---|---|---|---|---|---|
| | 180 | 210 | 240 | 270 | 300 | 330 |
| Δ [um] | 53 | 52 | 49 | 45 | 48 | 52 |

From the result shown in Table 5, it is understood that although the height of the ski jump itself is decreased as compared to that in Comparative Example 1, since the thickness of the cover layer was decreased, a ski jump having a relatively large height is generated as compared to that in Example 2. In addition, as a result, it is understood that the recording and reproducing properties are inferior. Furthermore, as in the case of Comparative Example 1, recording and reproducing were interfered with in some cases.

As has thus been described, according to the present invention, the ski jump of the cover layer can be suppressed because of the improvement in wettability by the optical catalytic effect layer.

In addition, although the optical catalytic effect layer used in the present invention includes titanium oxide, as described above, a material having an optical catalytic function, which will be discovered in future, may be included instead.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-330250 filed Nov. 15, 2005, which is hereby incorporated by reference herein in its entirety.

What is claimed is:

1. An optical recording medium comprising:
   a substrate;
   at least one recording layer provided on the substrate;
   a cover layer for protecting the recording layer, the cover layer being formed by a spin coating method; and
   an optical catalytic effect layer provided between the substrate and the recording layer in an in-plane direction of the substrate,
   wherein at least a portion of the cover layer is directly provided on the optical catalytic effect layer.

2. The optical recording medium according to claim 1, wherein the optical catalytic effect layer is provided directly on the substrate.

3. The optical recording medium according to claim 1, wherein the optical catalytic effect layer is provided below the at least one recording layer.

4. The optical recording medium according to claim 1, further comprising at least two recording layers provided on the substrate.

5. The optical recording medium according to claim 4, wherein a single optical catalytic effect layer is provided above the outermost recording layer.

6. The optical recording medium according to claim 4, further comprising at least two optical catalytic effect layers.

7. The optical recording medium according to claim 6, wherein one optical catalytic effect layer is provided on the substrate and another optical catalytic effect layer is provided on an interlayer formed between the at least two recording layers.

8. The optical recording medium according to claim 1, wherein the optical catalytic effect layer includes titanium oxide.

9. A method for of manufacturing an optical recording medium, the method comprising:
   forming at least one recording layer on a substrate;
   forming an optical catalytic effect layer between the substrate and the recording layer in an in-plane direction of the substrate; and
   forming a cover layer, with at least a portion of the cover layer provided directly on the optical catalytic effect layer, by a spin coating method.

10. The method according to claim 9, wherein the optical catalytic effect layer is formed directly on the substrate.

11. The method according to claim 9, wherein the optical catalytic effect layer is formed below the at least one recording layer.

12. The method according to claim 9, further comprising forming at least two recording layers on the substrate.

13. The method according to claim 12, wherein a single optical catalytic effect layer is formed above the outermost recording layer.

14. The method according to claim 12, further comprising forming at least two optical catalytic effect layers.

15. The method according to claim 14, wherein one optical catalytic effect layer is formed on the substrate and another optical catalytic effect layer is formed on an interlayer formed between the at least two recording layers.

16. The method according to claim 9, wherein the optical catalytic effect layer includes titanium oxide.

* * * * *